United States Patent [19]

Noe et al.

[11] Patent Number: 5,271,611

[45] Date of Patent: Dec. 21, 1993

[54] ARM FOR SUSPENDING A VIBRATING MEMBER

[75] Inventors: Frederic Noe, Orleans; Michel Domer, Valdampierre, both of France

[73] Assignee: Hutchinson, France

[21] Appl. No.: 906,283

[22] Filed: Jun. 29, 1992

[30] Foreign Application Priority Data

Jun. 27, 1991 [FR] France ............... 91 07973

[51] Int. Cl.5 .................. F16F 1/18; F16B 11/00
[52] U.S. Cl. .................. 267/158; 267/160; 267/272; 403/206
[58] Field of Search .......... 267/25, 30, 272, 273, 267/158, 160, 136, 140.11; 180/300, 312; 248/636, 638; 403/206, 286

[56] References Cited

U.S. PATENT DOCUMENTS

| 3,430,901 | 3/1969 | Cauvin | 248/573 |
| 3,730,509 | 5/1973 | Jorn | 267/152 |
| 4,278,726 | 7/1981 | Wieue | 267/152 |
| 4,893,779 | 1/1990 | Bergelt | 248/638 |

FOREIGN PATENT DOCUMENTS

| 0209139 | 7/1957 | Australia | 267/158 |
| 0176934 | 4/1986 | European Pat. Off. | 180/300 |
| 0418134 | 3/1991 | European Pat. Off. | |
| 619686 | 4/1927 | France . | |
| 2243371 | 4/1975 | France . | |
| 0796549 | 1/1981 | U.S.S.R. | 267/158 |

Primary Examiner—Robert J. Oberleitner
Assistant Examiner—Chris Schwartz
Attorney, Agent, or Firm—Larson and Taylor

[57] ABSTRACT

An arm for suspending a vibrating member is disclosed. The arm has low bending stiffness in two mutually perpendicular first and second directions (x and z), and high stiffness in compression and in traction in a third direction (y) perpendicular to the first and second directions. The arm comprises a blade made of a composite material which is fixed at one end to the vibrating member and fixed at an opposite end to a second member. The cross-sectional area along the length of the blade is constant and rectangular in shape. The opposed fixed ends of the blade are flat and their widths extend in mutually orthogonal planes in the first and second directions (x and z).

3 Claims, 2 Drawing Sheets

ARM FOR SUSPENDING A VIBRATING MEMBER

BACKGROUND OF THE INVENTION

1. Field of the Invention

The present invention relates to an arm for suspending a vibrating member, in particular the internal combustion engine of a vehicle, said arm being fixed at one end to said vibrating member and at its opposite end to a chassis, and being required to have low bending stiffness in two mutually perpendicular directions x and z, and high stiffness in compression and in traction in the direction y perpendicular to the two preceding directions, at least after the beginning of limited-amplitude displacement.

2. Description of the Prior Art

At present such arms are made of rigid metal and the elasticity desired for the connection between the vibrating member and a fixed chassis, e.g. between the internal combustion engine of a vehicle and its chassis, is obtained by means of a block that is resilient in all directions, e.g. made of rubber or the like, which block is interposed between the said chassis and the corresponding end of the said suspension arm, for example.

The drawback with that type of device lies in its high cost, and in the fact that the connection is resilient in all directions even though it may, on the contrary, be desirable for it to be somewhat stiff in a determined direction. In addition, rubber has limited temperature performance, and is subject to creep, and this constitutes a major drawback for an engine.

SUMMARY OF THE INVENTION

An object of the present invention is to remedy all of the above drawbacks, and to this end a suspension arm of the invention is essentially characterized in that it comprises a blade of composite material extending generally along the third-mentioned direction y and whose section at two fixing ends is flat and in two mutually orthogonal planes, such that the thickness e thereof is measured in the first of the above-mentioned directions x at one of said ends, while at the other one of said ends it is measured in the second of said directions z.

Suitable composite materials include any of the materials normally used in this type of application, for example a synthetic resin incorporating fibers of a material having a high modulus of elasticity such as glass, or carbon, or the like.

The conventional metal arm is thus eliminated and replaced by a resilient arm having different elasticity characteristics in the different directions in which forces are exerted. Material is thus saved, the creep inherent to rubber is avoided, and it is easy to impart optimum resilience characteristics in any direction to the arm as defined above.

Advantageously, the flat ends of said blade are received in respective blocks of resilient material held by respective rigid metal fittings suitable for being fixed respectively to said vibrating member and to said chassis.

This disposition prevents the blade of composite material being subjected at its ends to excessive shear stresses or to wear over time.

Provision may also be made for the area of the right cross-section of said blade to be constant along the entire length of the blade, thereby making it easier to make the blade by molding.

Said flattened ends of said blade may then be of different thicknesses so as to confer different bending stiffnesses to the ends of the blade.

On the contrary, in a variant, it is possible to provide for said blades to be of constant thickness and for the arm to be obtained by twisting a flat blade so that the planes of its ends are mutually orthogonal.

BRIEF DESCRIPTION OF THE DRAWINGS

Two embodiments of the invention are described below by way of non-limiting examples and with reference to the figures of the accompanying drawings, in which:

In the various figures, the blade of composite material is referenced 1. FIG. 1 shows reference directions x, y, and z in a rectangular coordinate system. It can be seen that the blade extends generally in the y direction, in which it presents a high degree of stiffness in traction and in compression. When an engine is being suspended, this direction may be the longitudinal direction of the vehicle or it may be its transverse direction, depending on whether it is desirable for the suspension to be stiff in one of these directions or in the other one thereof. In the other two directions, horizontal x and vertical z, the blade should, on the contrary, have low bending stiffness so as to absorb vibration as much as possible. This is obtained by the flat portions 2 and 3 provided at the ends of the blade 1, said flat portions extending in two orthogonal planes. It can be seen that the thickness e of the blade in the lefthand half of the drawing extends in the x direction, whereas the thickness e' of the blade in the right-hand half of the drawing extends in the z direction. The thicknesses e and e' may be different as can be seen by comparing FIGS. 2 and 3. As a result, it is possible to obtain different stiffnesses Kx and Kz: for example $\sim 50$ N/mm and $Kz \sim 150$ N/mm, for $e' > e$. Such a blade is easily made from composite material by molding.

FIG. 4 shows a blade of the same kind, but obtained by twisting a flat blade of constant thickness e through 90°, which blade may likewise be made of composite material. In this case, twisting is performed prior to polymerization of the resin in which the fibers are embedded.

Figure 2:
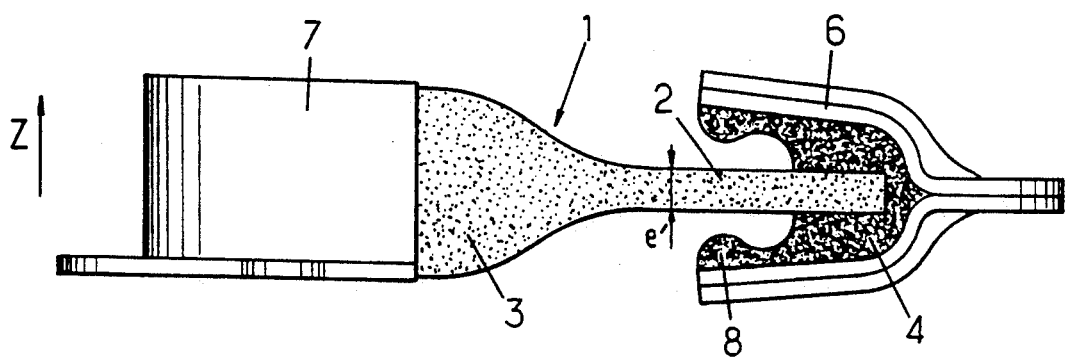
FIGS. 2 and 3 are respectively an elevation view and a plan view of said arm.
Figure 3:
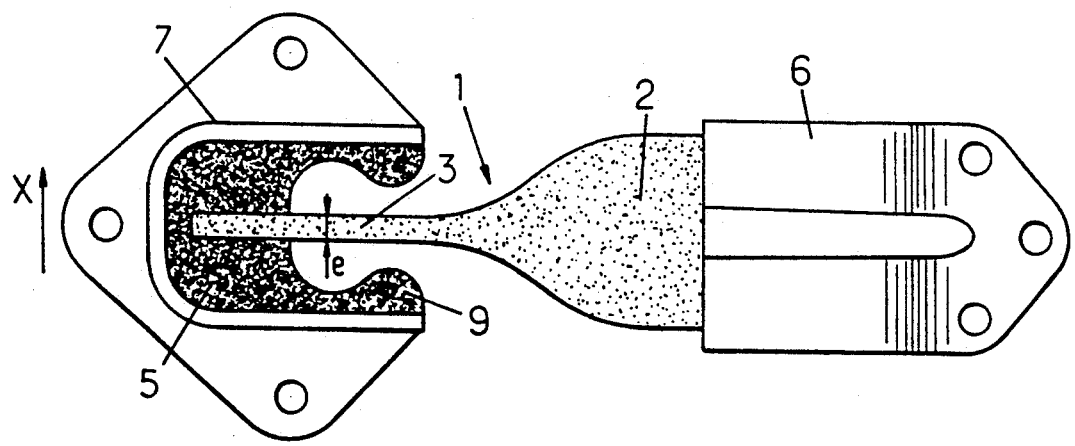

Whichever embodiment is used, it is preferable for the ends 2 and 3 of the blade 1 to be received in respective rubber or elastomer blocks 4 and 5 as shown in FIGS. 2 and 3. These blocks are bonded to the inside of respective rigid metal fittings 6 and 7 suitable for being fixed respectively to the engine (or other vibrating member) and to the chassis. These blocks include abutments 8 or 9 suitable for limiting vertical displacement of the blade 1 at its end 2 and horizontal displacement thereof at its end 3.

Figure 1:
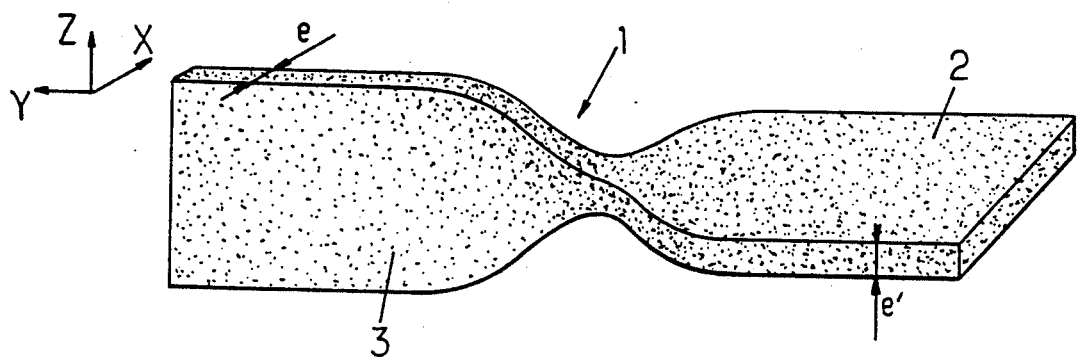
FIG. 1 is a perspective view of a first embodiment of the suspension arm.
Figure 4:
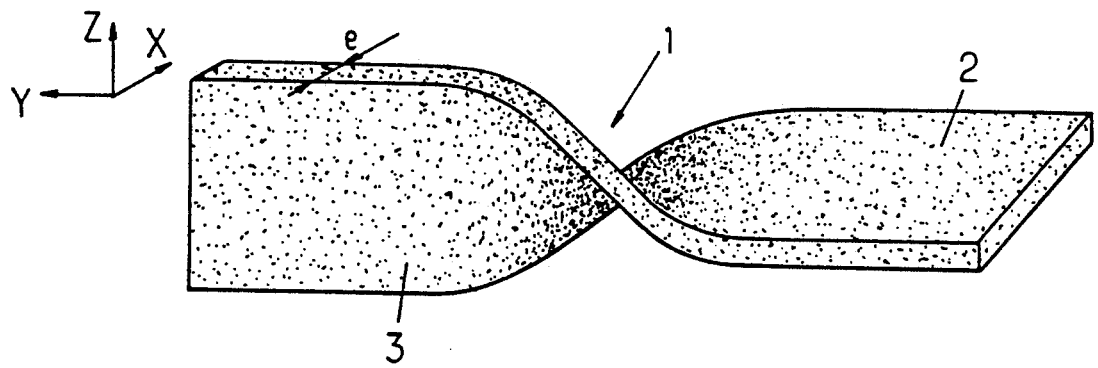
FIG. 4 is a perspective view of a variant.

It is naturally possible to adopt a similar mounting technique for the blade of FIG. 4.

We claim:

1. An arm for suspending a vibrating member, the arm having two opposed fixed ends, a first end being fixed to the vibrating member and a second end being fixed to a second member, and having low bending stiffness in a first direction (x) and in a second direction (z) orthogonal to the first direction (x), and high stiffness in compression and in traction in a third direction (y) orthogonal to the first and the second directions (x,y), the arm comprising a blade made of a composite material, a length of the blade extending generally along the third direction (y) and having a rectangular cross-section with a constant area from the first fixed end of the blade to the second fixed end, widths of the fixed ends of the blade extending in two mutually orthogonal planes, such that the width of the first end extends generally along the second direction (z) and a thickness (e) thereof, orthogonal to its width, extends in the first direction (x), and the width of the second end extends generally along the first direction (x) and a thickness (e') thereof, orthogonal to its width, extends in the second direction (z), and wherein the blade comprises, between the fixed ends, an intermediary region having a thickness which, as measured in the first direction (x), progressively increases in dimension from the thickness (e) of the first end of the blade up to the width of the second end of the blade, and having a width which, as measured in the second direction (z), progressively decreases in dimension from the width of the first end of the blade down to the thickness (e') of the second end of the blade.

2. An arm according to claim 1 wherein the fixed ends of the blade are received in respective blocks of resilient material held by respective rigid metal fittings suitable for attachment to the vibrating member and to the second member.

3. An arm according to claim 1 wherein the fixed ends of the blade have different thicknesses (e, e').

* * * * *